UNITED STATES PATENT OFFICE.

CARL DOBERT, DECEASED, LATE OF REINBECK, GERMANY, BY ANNA DOBERT, NÉE ROHLFF, OF REINBECK, GERMANY, HEIRESS AT LAW OF SAID CARL DOBERT.

MEANS FOR MARKING THE LINES OF LAWN-TENNIS COURTS.

1,145,754. Specification of Letters Patent. Patented July 6, 1915.

Application filed March 17, 1915. Serial No. 15,125.

*To all whom it may concern:*

Be it known that CARL DOBERT, late a subject of the King of Prussia, and resident of Schönningstäderstrasse, Reinbeck, in the Province of Schleswig-Holstein, in the Empire of Germany, but now deceased, did invent a certain new and useful Improved Means for Marking the Lines of Lawn-Tennis Courts, of which the following is a full, clear, and exact specification.

The present invention relates to improved means for marking the lines of lawn-tennis courts.

For marking the lines of lawn tennis-courts in a durable manner it has been practised to form the lines by means of band iron, the individual bands having been secured in place by nailing them onto wooden blocks or the like embedded in the ground. This marking of the lines of the courts is disadvantageous, seeing that band-iron is liable to be distorted under the influences of the weather and that it, in consequence thereof, rises above the ground, causing the players to be tripped and to stumble. Another drawback of this way of marking the lines consists in the facts, that the nails used in securing the band-iron in place get loose and rise and that due to the frost in winter the whole arrangement rises, thus requiring constant repairs and reducing thereby the life of the arrangement materially.

To obviate the drawbacks enumerated, according to the present invention the marking of the lines of lawn-tennis courts is effected by means of T-irons, which are carried by supports, embedded in the ground free from the influence of frost. The T-irons are connected to these supports by means of screw bolts, which pass through longitudinal slots in the ribs of the T-irons. In this way the marking of the lines of lawn-tennis courts is rendered more efficient, serviceable and durable in operation.

In the annexed drawings is illustrated by way of example one mode of carrying into practice this invention.

Figure 1:
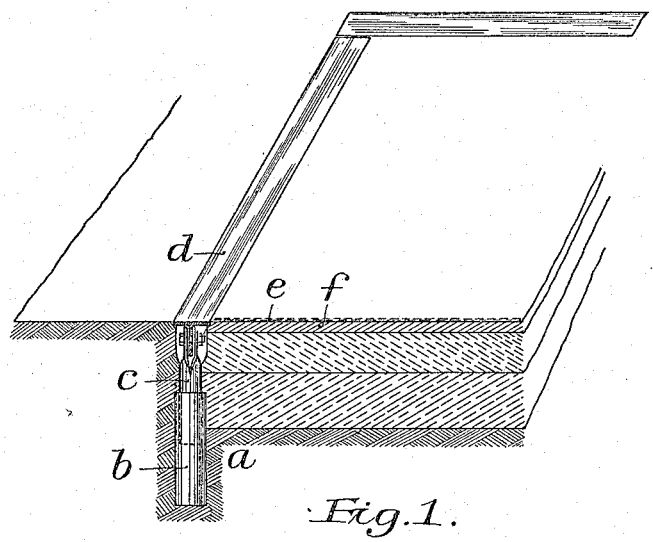
Figures 2, 3:
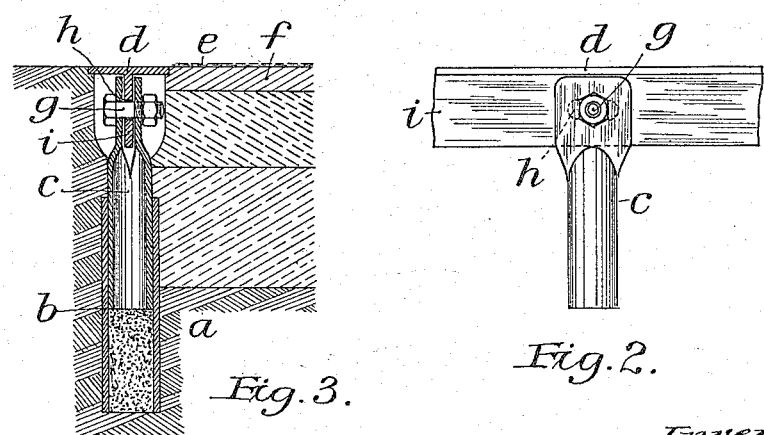

Figure 1 shows a portion of a lawn-tennis ground with the improved marking of the lines in sectional view. Fig. 2 shows the connection between the T-irons for marking the lines and their supports in the ground. Fig. 3 shows one of the supports embedded frost-free in the ground and a T-iron connected thereto in vertical section.

In preparing the lawn-tennis ground, on the lines dividing the several courts pipes *b* made of clay or cement or other suitable material are vertically embedded in the ground *a* at such a depth, that they are not subjected to the detrimental influence of frost in winter. The pipes *b* receive the supports *c* for the T-irons *d* which serve for marking the lines of the several courts. The supports *c*, which advantageously consist of short ends of gas pipes, are rigidly secured in the pipes *b* by cementing or in any other suitable manner. The supports *c* extend upwardly to such a height, that the T-irons, when connected thereto in the manner hereinafter to be described, register flush with the layer *f* beneath the topmost gravel layer *e*. The connection between the supports *c* and the T-iron *d* is effected in such a way, that no damage can be done by the influences of the weather or by the planing roller. To this end the connection is effected by means of screw bolts *g*, which hold the rib of the T-irons between the bifurcated top end of the supports *c*, the screw bolts passing through longitudinal slots *h* in the rib *i* of the T-irons to permit extension and contraction of the T-irons due to the influence of heat. Owing to the connection described the T-iron lines retain their original position and condition even during the winter, the supports *c* being secured against rising by the pipes *b*, which are embedded in the ground free from the detrimental influences of frost. Correct play is warranted by the fact, that the T-iron lines, registering flush with the layer *f*, do not offer projecting edges, which would give the balls hitting these edges a different direction. Another advantage due to the employment of T-irons for marking the lines of lawn-tennis courts consists in the fact, that the said irons when properly secured in place offer a reliable means for correctly leveling and planing the ground.

It is to be understood that the invention is not limited to the detail construction and arrangement of parts as herein shown and described, as it is manifest that variations and modifications therein may be resorted to, in the adaptation of the invention to varying conditions of use, without departing from the spirit and scope of the invention and improvements. The right is therefore reserved to make any variation or modification as properly falls within the scope of the invention and the terms of the following claims.

What is claimed is:—

1. Improved means for marking the lines of lawn-tennis courts, comprising T-irons and supports for these T-irons, said supports being embedded in the ground on the lines bordering the courts free from the influence of frost, the T-irons being connected to their supports so as to register flush with the layer below the topmost gravel layer and so as to be capable of extension and contraction due to the weather.

2. Improved means for marking the lines of lawn-tennis courts comprising T-irons, the rib of which is provided with longitudinal slots, and supports for the T-irons, said supports being bifurcated at their top end and provided with registering holes in the bifurcations, a screw bolt serving for connecting the T-irons with their supports by passing through the holes in the bifurcated top end of the latter and through the longitudinal slot in the rib of the T-irons, said rib entering the bifurcated top end of the supports, substantially as described and shown and for the purposes set forth.

In witness whereof I have hereunto signed my name this 13th day of Feb., 1915, in the presence of two subscribing witnesses.

ANNA DOBERT, née ROHLFF,
*Heiress of the estate of Carl Dobert, deceased.*

Witnesses:
FRANCIS R. STEWART,
CHARLES A. HALLEY, Jr.

Copies of this patent may be obtained for five cents each, by addressing the "Commissioner of Patents, Washington, D. C."